Figure 1:
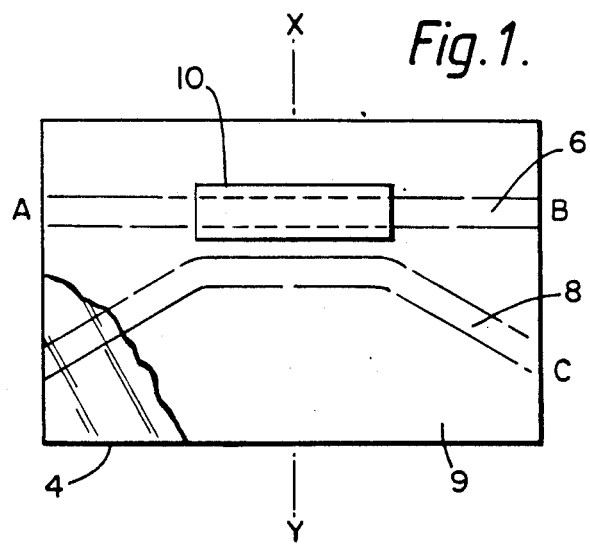

United States Patent [19]

Allen et al.

[11] Patent Number: 4,946,629
[45] Date of Patent: Aug. 7, 1990

[54] OPTICAL ELEMENT HAVING NON-LINEAR OPTICAL PROPERTIES INCLUDING A SUBSTRATE HAVING A COATING OF AN AZO COMPOUND

[75] Inventors: Simon Allen, Cheshire; Paul F. Gordon, Rochdale; Richard A. Hann, Cheshire, all of England

[73] Assignee: Imperial Chemical Industries, Plc, London, England

[21] Appl. No.: 274,926

[22] Filed: Nov. 25, 1988

Related U.S. Application Data

[62] Division of Ser. No. 6,919,640, Oct. 16, 1986, Pat. No. 4,804,787.

[30] Foreign Application Priority Data

Nov. 18, 1985 [GB] United Kingdom ................ 8525745
Jun. 9, 1986 [GB] United Kingdom ................ 8613921

[51] Int. Cl.$^5$ .................... G02B 1/04; G02B 1/08; G02B 6/00
[52] U.S. Cl. .................... 252/589; 252/582; 252/583; 252/585; 350/316; 372/22; 372/92; 372/98; 430/945; 430/940; 360/96.24; 360/316
[58] Field of Search .................... 534/573 L; 252/582, 252/583, 585, 589; 350/416; 372/22; 430/945

[56] References Cited

U.S. PATENT DOCUMENTS 3,351,580 11/1967 Koiue et al. .................... 539/649
4,619,893 10/1986 Takagi et al. .................... 534/856 X

FOREIGN PATENT DOCUMENTS 136269 4/1970 Czechoslovakia .................... 534/573
59-96166 6/1984 Japan .................... 534/649
61152647 7/1986 Japan .................... 534/573
1425029 6/1973 United Kingdom .................... 537/649

Primary Examiner—Floyd D. Higel
Attorney, Agent, or Firm—Cushman, Darby & Cushman

[57] ABSTRACT

(i) A compound of the formula:

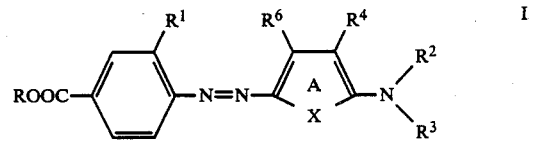

wherein
R is H, a metal or a group containing a tetravalent N atom;
X is

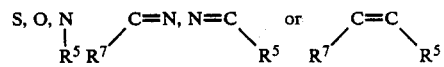

$R^1$ is $NO_2$, CN or COOY;
Y is H, $C_{1-4}$-alkyl, a metal or a group containing a tetravalent N atom;
$R^2$ & $R^3$ are each independently H or a non-hydrophilic aliphatic or cycloaliphatic group containing up to 30 carbon atoms;
$R^4$ & $R^5$ are each independently H or a non-hydrophilic aliphatic or cycloaliphatic group containing up to 30 carbon atoms;
and $R^6$ & $R^7$ are each independently H or a non-hydrophilic group containing up to 4 carbon atoms;
or $R^4$ & $R^6$ together comprise ring fused to Ring A and $R^5$ & $R^7$ are as hereinbefore defined;
or $R^5$ & $R^7$ together comprise ring fused to Ring A and $R^4$ & $R^6$ are as hereinbefore defined;
or $R^2$ & $R^4$ together with the N atom to which $R^2$ is attached from a ring fused to Ring A and $R^3$ & $R^5$ are as hereinbefore defined;
or $R^3$ & $R^5$ together with the N atom to which $R^3$ is attached form a ring fused to Ring A and $R^2$ & $R^4$ are as hereinbefore defined;

provided there are, in total, from 8 to 40 carbon atoms in one or two of the groups independently represented by $R^2$, $R^3$, $R^4$ & $R^5$;

(ii) an optical element comprising a compound of Formula I having non-linear optical (NLO) properties for use in the generation of NLO signals.

(iii) a method of preparation of such an optical element (Abstract continued on next page.)

comprising a plurality of monomolecular layers of the compound of Formula I on the surface of a transparent or reflecting substrate by a Langmuir-Blodgett technique; and (iv) an optical device incorporating such an optical element.

2 Claims, 1 Drawing Sheet

OPTICAL ELEMENT HAVING NON-LINEAR OPTICAL PROPERTIES INCLUDING A SUBSTRATE HAVING A COATING OF AN AZO COMPOUND

This is a division of application Ser. No. 06/919,640, filed Oct. 16, 1986, now U.S. Pat. No. 4,804,787.

This specification describes an invention relating to an azo compound and to the application thereof in non-linear optics (NLO).

According to the present invention there is provided an azo compound of the formula:

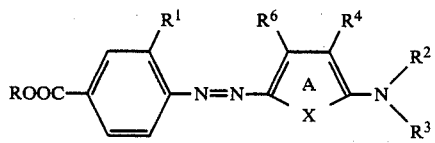

wherein
R is H, a metal or a group containing a tetravalent N atom;
X is

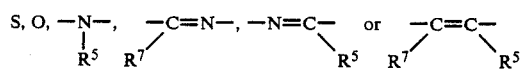

$R^1$ is $NO_2$, CN or COOY;
Y is selected from H, $C_{1-4}$-alkyl, a metal or a group containing a tetravalent N atom;
$R^2$ & $R^3$ are each independently H or a non-hydrophilic aliphatic or cycloaliphatic group containing up to 30 carbon atoms;
$R^4$ & $R^5$ are each independently H or a non-hydrophilic aliphatic or cycloaliphatic group containing up to 30 carbon atoms;
and $R^6$ & $R^7$ are each independently H or a non-hydrophilic group containing up to 4 carbon atoms;
or $R^4$ & $R^6$ together comprise ring fused to Ring A and $R^5$ & $R^7$ are as hereinbefore defined;
or $R^5$ & $R^7$ together comprise ring fused to Ring A and $R^4$ & $R^6$ are as hereinbefore defined;
or $R^2$ & $R^4$ together with the N atom to which $R^2$ is attached form a ring fused to Ring A and $R^3$ & $R^5$ are as hereinbefore defined;
or $R^3$ & $R^5$ together with the N atom to which $R^3$ is attached form a ring fused to Ring A and $R^2$ & $R^4$ are as hereinbefore defined;
provided there are, in total, from 8 to 40 carbon atoms in one or two of the groups independently represented by $R^2$, $R^3$, $R^4$ & $R^5$.

Where R or Y is a metal it is preferably divalent, preferred metals being cadmium, barium and lead, and other suitable metals being manganese, zinc, magnesium and strontium.

Where R or Y is a group containing a tetravalent nitrogen atom this may be ammonium, such as $NH^4$, mono-, di- or tri-substituted or quaternary ammonium, such as mono-, di-, tri- and quaternary alkyl and substituted alkyl ammonium; bis(ammonium), such as alkylene and alkenylene diammonium; guanidinium; biguanidinium and amidinium. The tetravalent N atom may carry substituents other than hydrogen and suitable substituents include $C_{1-20}$-alkyl, such as methyl, ethyl, lauryl, cetyl, stearyl; aryl, such as phenyl; aralkyl, such as benzyl; cycloalkyl, such as cyclohexyl; each of which may be substituted by such as $C_{1-4}$-alkyl, e.g. tolyl; $C_{1-4}$-alkoxy, e.g. anisyl and ethoxyethyl; halogen, e.g. chlorophenyl; and hydroxy, e.g. hydroxyethyl. Specific examples of suitable groups are $NH_4$, $N(CH_3)_4$, $N(C_2H_4OH)_4$, $N(CH_3)_3(C_{28}H_{37})$, $N(CH_3)_3(C_{16}H_{33})$, $H_3N-C_2H_4-NH_3$ and $N(CH_3)_2(C_{12}H_{25})(-CH_2C_6H_5)$. Where Y is $C_{1-4}$-alkyl it is preferably methyl.

It is preferred that $R^1$ is CN or, more especially, $NO_2$.

By the term non-hydrophilic is meant that the groups represented by $R^2$ to $R^7$ should not carry hydrophilic substituents, such as carboxylate, sulphonate, phosphonate and hydroxyl.

Where $R^4$ & $R^6$ or $R^5$ & $R^7$ and two ring carbon atoms form a second ring, fused to Ring A, this is preferably aromatic and may be carbo- or hetero-cyclic, such as, benzene, pyrrole, furan, thiazole, isothiazole, thiophene or pyridine, in which case Ring A and $R^4$ & $R^6$ or $R^5$ & $R^7$ form a naphthalene, indole, benzofuran, benzothiazole, benzoisothiazole, thianaphthene or quinoline nucleus, respectively.

Where $R^4$ & $R^2$ or $R^5$ & $R^3$, together with the N atom and two carbon atoms of Ring A form a second ring, fused to Ring A, this is preferably a 5 or 6 membered cycloaliphatic ring such as 2-pyrroline, tetrahydropyridine, 4-oxazoline or 4-thiazoline, in which case $R^2$, $R^4$ (or $R^3$, $R^5$), Ring A and the N atom form 2,3-dihydroindole, 1,2,3,4-tetrahydroquinoline, benzoxazoline or benzothiazoline, respectively.

It is preferred that at least one of $R^2$, $R^3$, $R^4$, $R^5$, and especially $R^2$, but not more than two, preferably $R^2$ and one of $R^3$, $R^4$ & $R^5$, is a long chain aliphatic or cycloaliphatic group, preferably the former, containing from 8 to 20, more preferably 12 to 20, carbon atoms in which case the remaining groups preferably contain not more than 4 carbon atoms and are more preferably hydrogen. If none of $R^2$, $R^3$, $R^4$ and $R^5$ contains 8 or more carbon atoms then it is preferred that $R^2$ and $R^3$ are aliphatic or cycloaliphatic groups carrying a total of at least 8, and more preferably at least 12, carbon atoms and $R^4$ & $R^5$ each contains not more than four carbon atoms. Minor variations in chain length within these preferred limits have little effect on the non-linear optical properties of the compound. It is also generally preferred that the aliphatic chain is unbranched or at most contains only a one or two branches, each containing one or two carbon atoms.

The long chain aliphatic or cycloaliphatic group represented by $R^2$, $R^3$, $R^4$ or $R^5$ is preferably an alkyl, alkenyl or cycloalkyl group or a group containing a mixture of these which, in the case of $R^4$ and $R^5$, may be joined directly to Ring A or indirectly through a heteroatom, such as oxygen, sulphur or nitrogen or through a $-CO-$, $-SO_2-$, $-CO.O-$ or $-SO_2.O-$ link. The carbon chain may be interrupted by heteroatoms, especially oxygen or sulphur, but is is preferred that there is not more than one heteroatom for every twelve carbon atoms in the chain. The carbon chain may carry non-hydrophilic substituents, but is preferably unsubstituted.

Examples of the group containing at least 8 carbon atoms, represented by $R^5$, $R^4$, $R^3$, and particularly by $R^2$, are octyl, nonyl, decyl, hendecyl, dodecyl (lauryl), tridecyl, tetradecyl (myristyl), pentadecyl, hexadecyl (cetyl), heptadecyl (margaryl), octadecyl (stearyl), nonadecyl, eicosanyl (arachidyl), heneicosanyl, docosanyl (behenyl), tricosanyl, tetracosanyl (lignoceryl), hexacosanyl (ceryl), 9-hexadecenyl (palmitoleyl), 9-octadecenyl (oleyl), 10-eicosenyl, 9,12-octadecadienyl (linoleyl), 6-hexoxyhexyl, ethylcyclohexyl and cyclohexylethyl, especially where these are straight chains. In the case of $R^4$ and $R^5$ these may be joined to Ring A through an oxygen, sulphur or nitrogen atom or through a —CO—, —SO$_2$—, —CO.O— or —SO$_2$.O— link, examples being methoxy, methylthio, ethoxy, butoxy, butylthio, octoxy, dodecoxy, dodecylthio, hexadecoxy, octadecoxy, dodecylamino, octadecylamino, octadecoxycarbonyl & dodecoxycarbonyl. Where $R^2$ and $R^3$ together contain at least 8 carbon atoms examples of suitable combinations are hexyl and butyl; ethyl and hexyl; heptyl and methyl; heptyl and propyl; and nonyl and methyl.

The groups independently represented by $R^6$ and $R^7$ may be any non-hydrophilic group and are preferably hydrogen. Where they are other than hydrogen it is preferred that they are electron-donating groups, examples of suitable groups being, $C_{1-4}$-alkyl, $C_{1-4}$-alkoxy, NH$_2$ and mono- and di-substituted amino, especially mono- and di-$C_{1-4}$-alkylamino, such as methylamino, ethylamino and N,N-dimethylamino.

Preferred compounds of Formula I are:

(i) 4-(4-[N-n-dodecyl-N-methylamino]phenylazo)-3-nitrobenzoic acid, hereinafter referred to as DPNA, and the related compounds formed by reacting diazotised 3-nitro-4-aminobenzoic acid with the following coupling components under standard conditions, such as those given in Example 1,

| | |
|---|---|
| N-methyl-N-decylaniline, | N-ethyl-N-n-dodecylaniline, |
| N-ethyl-N-decylaniline, | N-ethyl-N-hexadecenylaniline, |
| N-ethyl-N-tridecylaniline, | N-methyl-N-octadecylaniline, |
| N-arachidylaniline, | N-methyl-N-arachidylaniline, |
| N-lignocenylaniline, | 2-methoxy-N-methyl-N-dodecylaniline, |
| N-butyl-N-dodecylaniline, | 2-methoxy-N-arachidylaniline, |
| N,N-dioctylaniline, | 2-octadecoxy-N,N-dimethylaniline, |
| N,N-diheptylaniline, | N-octadecylbenzoxazoline, |
| N-ethyl-N-hexylaniline, | N-tetradecyldihydro-1,4-benzoxazine |
| N-butyl-N-octylaniline, | 3-amino-N-methyl-N-octadecylaniline, |
| 2-dodecoxy-N-ethylaniline, | 2-octadecoxy-5-methoxyaniline, |
| 2-hexadecenoxyaniline, | 2-(N-ethyl-N-octadecylamino)furan, |
| 2-octadecoxyaniline, | 1-(N-butyl-N-hexylamino)naphthalene, |
| 2-hexadecoxyaniline, | N-dodecyl-1,2,3,4-tetrahydroquinoline |
| N-octadecylaniline, | 2-amino-3-octadecoxycarbonylthiophene |
| 2-(N-methyl-N-hexadecenylamino)thiophene, | |
| 3-N'-methylamino-N-ethyl-N-dodecylaniline, | |
| 2,5-dimethoxy-N-methyl-N-hexadecylaniline, | |
| 2-methoxy-5-amino-N-ethyl-N-octadecylaniline, | |
| 7-methoxy-N-tetradecyl-1,2,3,4-tetrahydroquinoline, | |
| 2-(N-dodecylamino)-3-cyano-6-(N-ethylamino)pyridine, | |
| 2-(N-octadecylamino)-3-cyano-6-(N-ethylamino)pyridine; | |
| 2-(N-methyl-N-octadecylamino)-6-(N-methylamino)pyridine, | | and the coupling components listed below in (ii), (iii) & (iv);

(ii) the compounds formed by reacting diazotised 3-cyano-4-aminobenzoic acid with the following coupling components under standard conditions, such as those given in Example 1,

| | |
|---|---|
| N-arachidylaniline, | 2-octadecoxy-N-ethylaniline, |
| N-butyl-N-decylaniline, | 3-amino-N-methyl-N-dodecylaniline, |
| N-octyl-N-decylaniline, | N-ethyl-N-n-dodecylaniline, |
| 2-methoxy-N-methyl-N-octadecylaniline, | |
| 2-(N-methyl-N-hexadecenylamino)thiophene, | |
| 1-(N-methyl-N-dodecylamino)naphthalene, | |
| 2-(N-methyl-N-dodecylamino)-6-amino-pyridine, | | and the coupling components listed in (i) above and (iii) and (iv) below;

(iii) the compounds formed by reacting diazotised 3-methoxycarbonyl-4-aminobenzoic acid with the following coupling components under standard conditions, such as those given in Example 1,

| | |
|---|---|
| N-butyl-N-decylaniline, | N-ethyl-N-n-dodecylaniline, |
| N-octyl-N-decylaniline, | 3-amino-N-methyl-N-dodecylaniline, |
| N-arachidylaniline, | 2-octadecoxy-N-ethylaniline, |
| 2-methoxy-N-methyl-N-octadecylaniline, | |
| 2-(N-methyl-N-hexadecenylamino)thiophene, | |
| 1-(N-methyl-N-dodecylamino)naphthalene, | |
| 2-(N-methyl-N-dodecylamino)-6-aminopyridine; | | and the coupling components listed in (i) & (ii) above and (iv) below; and (iv) the compounds formed by reacting diazotised 4-aminoisophthalic acid with the following coupling components under standard conditions, such as those given in Example 1 below,

| | |
|---|---|
| N-butyl-N-decylaniline, | 2-octadecoxy-N-ethylaniline, |
| N-octyl-N-decylaniline, | N-ethyl-N-n-dodecylaniline, |
| N-arachidylaniline, | 3-amino-N-methyl-N-dodecylaniline, |
| 2 methoxy-N-methyl-N-octadecylaniline, | |
| 2-(N-methyl-N-hexadecenylamino)thiophene, | |
| 1-(N-methyl-N-dodecylamino)naphthalene, | |
| 2-(N-methyl-N-dodecylamino)-6-aminopyridine. | | and the coupling components listed under (i), (ii) and (iii) above.

The compound of Formula I is non-centrosymmetric and polarised along its longitudinal axis, i.e. through the carboxylate group, ROOC—, the azo group, —N═N—, and the substituted amino group —NR$^2$R$^3$, because the carboxylate group is electron-withdrawing and the substituted amino group is electron-donating. A molecule of the compound can therefore be represented as an electronic vector directed along this axis from the substituted amino towards the carboxylate group.

It has been found that the compound of Formula I (hereinafter referred to as the "present NLO compound") is adapted for the preparation of optical elements having non-linear optical properties, especially second-order, non-linear optical properties which can effect changes in the properties of an optical signal. The word "optical" is used to indicate properties associated with electromagnetic radiation, in the region of the electromagnetic spectrum from wavelengths of 200 nanometers (nm) to 11,000 nm, especially from 300 nm to 3000 nm, and is not restricted merely to visible radiation in the region from 400 nm to 700 nm.

It is possible to calculate the second-order electronic polarisability (SOEP) of the present NLO compound as applicable to the process of second harmonic operation, using the method of Docherty et al. in J Chem Soc, Faraday Trans 2, 81, 1179-92 (1985). The calculated value of the SOEP is a "zero-energy" value, SOEP[0], corresponding to an infinite optical wavelength, which gives a good measure of the intrinsic molecular optical efficiency of the molecule. The SOEP at any finite wavelength will be greater than the value of SOEP[0], by an amount which depends on several factors, as described in the above mentioned paper, including the proximity of the second harmonic wavelength to any absorption wavelength of the molecule. Values for SOEP[0] and also the SOEP for a fundamental optical wavelength of 1.06 μm, SOEP[1.06], are shown for some examples of the present NLO compound in Tables 1, 2 and 3.

TABLE 1

Compounds of Formula I in which:
X is —C≡C—; and $R = R^4 = R^5 = R^6 = R^7 = H$

| Cpd No | $R^1$ | $R^2$ | $R^3$ | SOEP [0] (#) | SOEP [1.06] (#) |
|---|---|---|---|---|---|
| 1 | $NO_2$ | $C_2H_5$ | $C_6H_{13}$ | 69.9 | 410 |
| 2 | $NO_2$ | $C_7H_{15}$ | $C_7H_{15}$ | 69.9 | 412 |
| 3 | $NO_2$ | $C_8H_{17}$ | $C_8H_{17}$ | 71.5 | 421 |
| 4 | $NO_2$ | $C_2H_5$ | $C_{16}H_{33}$ | 71.2 | 416 |
| 5 | $NO_2$ | $CH_3$ | $C_{18}H_{37}$ | 71.4 | 410 |
| 6 | $NO_2$ | $CH_3$ | $C_{12}H_{25}$ | 71.3 | 403 |
| 7 | CN | $CH_3$ | $C_{12}H_{25}$ | 61.8 | 333 |
| 8 | $COOCH_3$ | $CH_3$ | $C_{12}H_{25}$ | 61.2 | 305 |

TABLE 2

Compounds of Formula I in which:
X is —C≡C—; and $R = R^4 = R^6 = H$

| Cpd. No | $R^1$ | $R^2$ | $R^3$ | $R^5$ | $R^7$ | SOEP [0] (#) | SOEP [1.06] (#) |
|---|---|---|---|---|---|---|---|
| 9 | $NO_2$ | $C_2H_5$ | $C_{18}H_{37}$ | $OCH_3$ | H | | |
| 10 | $NO_2$ | $CH_3$ | $CH_3$ | $OC_{18}H_{37}$ | H | 97.3 | |
| 11 | $NO_2$ | H | H | $OC_{16}H_{33}$ | H | 56.0 | 351 |
| 12 | CN | H | H | $OC_{16}H_{33}$ | H | 49.5 | 285 |
| 13 | $COOCH_3$ | H | H | $OC_{16}H_{33}$ | H | 48.6 | 258 |
| 14 | $NO_2$ | $C_{12}H_{25}$ | *—$(CH_2)_3$—* | | H | 71.7 | 450 |
| 15 | CN | $C_{12}H_{25}$ | *—$(CH_2)_3$—* | | H | 63.5 | 371 |
| 16 | $COOCH_3$ | $C_{12}H_{25}$ | *—$(CH_2)_3$—* | | H | 63.1 | 337 |
| 17 | $NO_2$ | $C_4H_9$ | $C_6H_{13}$ | —CH=CH—CH=CH— | | 73.1 | 1147 |
| 18 | CN | $C_4H_9$ | $C_6H_{13}$ | —CH=CH—CH=CH— | | 67.3 | 930 |
| 19 | $COOCH_3$ | $C_4H_9$ | $C_6H_{13}$ | —CH=CH—CH=CH— | | 65.8 | 762 |

TABLE 3

Compounds of Formula I in which $R = R^6 = H$

| Cpd | X | $R^1$ | $R^2$ | $R^3$ | $R^4$ | $R^7$ | SOEP [0] (#) | SOEP [1.06] (#) |
|---|---|---|---|---|---|---|---|---|
| 20 | S | $NO_2$ | $CH_3$ | $C_{16}H_{33}$ | H | — | 63.2 | 608 |
| 21 | S | CN | $CH_3$ | $C_{16}H_{33}$ | H | — | 57.0 | 525 |
| 22 | S | $COOCH_3$ | $CH_3$ | $C_{16}H_{33}$ | H | — | 56.3 | 462 |
| 23 | S | $NO_2$ | H | H | $COOC_{18}H_{37}$ | — | 42.9 | 243 |
| 24 | O | $NO_2$ | $C_2H_5$ | $C_{18}H_{37}$ | H | — | 87.9 | 2569 |
| 25 | O | CN | $C_2H_5$ | $C_{18}H_{37}$ | H | — | 79.0 | 1631 |
| 26 | O | $COOCH_3$ | $C_2H_5$ | $C_{18}H_{37}$ | H | — | 79.9 | 1309 |
| 27 | —C=N—$R^7$ | $NO_2$ | $CH_3$ | $C_{18}H_{37}$ | H | $NHCH_3$ | 61.7 | |
| 28 | —C=N—$R^7$ | CN | $CH_3$ | $C_{18}H_{37}$ | H | $NHCH_3$ | 54.9 | 395 |
| 29 | —C=N—$R^7$ | $COOCH_3$ | $CH_3$ | $C_{18}H_{37}$ | H | $NHCH_3$ | | |
| 30 | —C=N—$R^7$ | $NO_2$ | H | $C_{12}H_{25}$ | CN | $NHC_2H_5$ | 47.0 | 325 |

Notes for Tables 1 to 3
× $10^{-30}$ $cm^5$/esu
*—$(CH_2)_3$—* indicates that $R^3$ and $R^5$ together with the N atom and two C atoms of Ring A form a tetrahydropyridine ring fused to Ring A, i.e. Ring A, $R^3$, $R^5$ and the N atom form a 1,2,3,4-tetrahydroquinoline nucleus.
—CH=CH—CH=CH— indicates that $R^5$ and $R^7$ together with two C atoms of Ring A form a benzene ring fused to Ring A, i.e. Ring A, $R^5$ and $R^7$ form a naphthalene nucleus According to a second feature of the present invention there is provided an optical element having non-linear optical properties comprising a transparent or reflecting substrate having at least a partial superficial coating comprising at least two monomolecular layers (hereinafter called "monolayers") of a compound of Formula I, in which the molecules in both layers are aligned in the same manner.

By "aligned in the same manner" is meant that the electronic vectors along the longitudinal axes of the molecules in the layers are substantially parallel and in the same sense.

It is not essential that the monolayers of the present NLO compound are adjacent and it can be advantageous to separate the monolayers with intervening layers of other materials. Where the two monolayers of the present NLO compound are adjacent, the substituted amino groups (—$NR^2R^3$) of the molecules in one monolayer will be adjacent to the carboxylate groups (RO—OC—) in the adjacent monolayer ("head to tail" array).

Where the substrate is transparent at the wavelength of light to be used it may be in the form of an optical waveguide on the outer surface of which the present NLO compound is deposited. With this form of element an optical signal passing along the waveguide interacts with the superficial coating of the present NLO compound, via the evanescent wave which extends into this coating, and gives rise to non-linear optical effects. Examples of suitable substances for a substrate in the form of a waveguide are glass, lithium niobate and silicon nitride on oxidised silicon.

Alternatively, a transparent substrate may be in the form of a plate or disc on one, or both, surfaces of which a coating of the present NLO compound can be formed in discrete monolayers. With this form of element a non-linear optical effect may be obtained by transverse illumination of the substrate and film(s). Suitable substrates for such an optical element include glass, silica and polymethylmethacrylate (PMMA).

Where the substrate is reflecting it conveniently has a plane reflecting surface on which a superficial coating of the present NLO compound, in discrete monolayers, may be formed so that the optical signal passes through the coating immediately before and after contact with the reflecting surface. Examples of suitable materials for the reflecting substrate substrate are aluminium, silver, or aluminium or silver films deposited on a support substrate such as glass, silica, quartz or PMMA. With this form of optical element it is possible to attain efficient non-linear processes by exciting the so called "surface plasmon" modes reported in the literature [Stegman et al., Appl Phys Lett, 41(10), 906, (1982) & Sand et al., Appl Optics, 21(22), 3993, (1982)].

The optical element of the second aspect of the invention can be prepared by a Langmuir-Blodgett technique and according to a third aspect of the invention there is provided a method for the preparation of an optical element having non-linear optical properties which comprises passing a surface of a transparent or reflecting substrate into and out of a Langmuir trough containing a liquid carrying a superficial monomolecular layer of a compound of Formula I. Where the layers of the present NLO compound are not adjacent intervening layers may be formed by passing the substrate into the liquid through a surface carrying a superficial layer of the present NLO compound and out of the liquid through another surface carrying a superfical layer of a different compound, or vice versa.

The liquid, hereinafter referred to as the sub-phase, is preferably an aqueous medium and the mono-molecular layer or layers are maintained in the normal manner by adjustment of the surface area with movable dams.

The optical element of the second aspect of the invention, in various forms, is capable of producing second order non-linear optical effects in a number of ways in various optical devices.

According to a fourth aspect of the present invention there is provided an optical device comprising a non-linear optical element in accordance with the second aspect of the present invention.

An example of an optical device in accordance with the present invention, in which the optical element comprises a substrate in the form of a transparent waveguide having an intimate coating comprising multiple monolayers of the present NLO compound, consists of an oxidised silicon plate having a first superficial (lower) layer of silicon nitride to form a superficial plane waveguide and a second superficial (upper) layer comprising discrete monolayers of the present NLO compound. In operation, a first optical signal is passed through the waveguide, i.e. in the plane thereof, and interacts with the coating, via the evanescent wave which extends into the coating. This interaction generates a second optical signal, at the second harmonic frequency with respect to the first optical signal, which can be detected in the combined optical signal leaving the waveguide.

Figure 2:
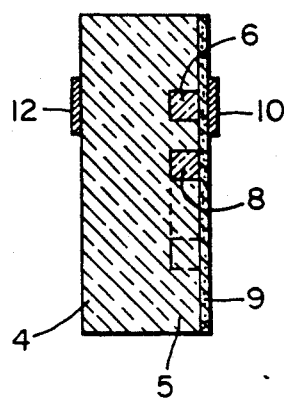

A second device in accordance with the present invention is described in relation to FIGS. 1 & 2 of the accompanying drawings, in which FIG. 1 is a plan view and FIG. 2 is a cross-section on the line X-Y in FIG. 1.

In the second device the optical element comprises a glass substrate, 4, in the upper surface region, 5, of which are two transparent stripe waveguides, 6 & 8, formed in the desired pattern by the well-known ion exchange or ion bombardment techniques. The stripe waveguides are positioned to run closely parallel over the central part of their length during which they are separated by a distance of a few micrometers (typically 2-5 $\mu$m). The whole surface of the substrate, 4, is coated with a film, 9, of discrete monolayers of the present NLO compound. A pair of electrodes, 10, 12, connected to a power source (not shown) is arranged with one electrode, 10, above and the other, 12, below one of the stripe waveguide, 6. In operation an optical signal is passed through the first waveguide, 6, from A to B and a voltage is applied across the electrodes. This alters the refractive index of the coating, due to the d.c. electrooptic (Pockels) effect, and thus the propagation constant of the first waveguide, 6. By suitable adjustment of the applied voltage the propagation constant of the first waveguide, 6, can be arranged so that the optical signal passing through this waveguide, 6, is coupled into the second waveguide, 8, and produces a second optical signal emerging from the device at C.

The optical element of the second aspect of the present invention may be used in other known forms of optical device incorporating an optical element by replacing the NLO compound used therein, e.g. lithium niobate, with the present NLO compound.

The invention is further illustrated by the following Examples in which all parts and percentages are by weight unless otherwise indicated.

EXAMPLE 1

4-(4-[N-n-dodecyl-N-methylamino]phenylazo)-3-nitrobenzoic acid (DPNA)

4-Amino-3-nitrobenzoic acid (3.64 g, 0.02M, diazo comp't) was dissolved in dilute sodium hydroxide solution (50 ml, 0.3N) at 60° C. Hydrochloric acid (9 ml, 36%) was added with stirring to give a fine yellow precipitate and the suspension was then allowed to cool to 30° C. Sodium nitrite (1.38 g, 0.02M) was dissolved in water (10 ml) and added dropwise to the suspension. Stirring was continued for 1.5 hours after which the solution was filtered and the filtrates were treated with sulphamic acid to remove excess of nitrous acid. The clear solution was added to a solution of N-n-dodecyl-N-methylaniline (5.5 g, 0.02M, coupler) at room temperature giving an immediate red coloration. After a few minutes a dark red precipitate formed and further precipitation was induced by addition of water (100 ml). The solid product was filtered, washed with cold water and dried. The crude product was chromatographed on silica with chloroform as eluent and finally recrystallised from ethanol to yield dark red crystals (2.45 g, yield 26%) having the following properties:

Elemental analysis: Found: C 67.0; H 8.0; N 11.6; $C_{26}H_{36}N_4O_4$ requires: C 66.7; H 7.7; N 11.9.

MP: 155°-6° C.

Absorption maximum (Abs Max): 486 nm (in $CHCl_3$).

Infra-red spectrum: 2500-2700 $cm^{-1}$ (br), 1670 $cm^{-1}$ (str).

Mass spectrum: 468 ($M^+$, 100%), 313 (100%), 135 (80%).

4-Amino-3-nitrobenzoic acid was obtained from commercial sources (Kodak) and N-n-dodecyl-N-methylaniline was prepared by the method of Breusch and Baykut; Rev. Faculte Sci. Univ Istambul, 1951, 16A, p221 (Chem. Abs., 1953, 47 3257f).

EXAMPLE 2

4-(4-[N-octadecyl-N-methylamino]phenylazo)-3-nitrobenzoic acid (OPNA)

This was prepared by the method of Example 1 using the equivalent quantity of N-octadecyl-N-methylaniline in place of the N-n-dodecyl-N-methylaniline used in Example 1. The crude product was chromatographed on silica with chloroform as eluent and finally recrystalised from ethanol to yield dark red crystals having the following properties:

MP: 151° C.;

Absorption maximum (Abs Max): 485 nm (in CHCl$_3$).

The N-methyl-N-octadecylaniline used in Example 2 was prepared by the following method:

A flask was charged with N-methylaniline (10.72 g, 0.1 mole), diethylether (100 ml) and triethylamine (11.2 g, 0.11 mole). To this stirred solution was added a solution of octadecanoyl chloride (33.32 g, 0.11 mole) in diethylether (50 ml), dropwise, over a period of two hours keeping the temperature below 35° C. After about a third of the octadecanoyl chloride had been added the reaction mixture became very paste-like so it was diluted with ether (100 ml).

On completion of the addition the slurry was stirred for 1 hour and then allowed to stand at room temperature for 20 hours. The triethylamine hydrochloride was filtered off and washed with ether (50 ml). The organic solution (filtrate) and washings were washed with water (100 ml), saturated K$_2$CO$_3$ solution (2×100 ml) and 2M HCl (100 ml) and water (2×100 ml). Organic phase lost to the K$_2$CO$_3$ wash liquor was recovered with ether (50 ml) which was added to the washed organic solution. The latter was dried over anhydrous MgSO$_4$, filtered, and the solvent was removed by distillation to leave N-methyl-N-octadecanoylaniline.

The N-methyl-N-octadecanoylaniline (20 g, 0.054 mole) was charged to a small soxhlet thimble. The receiver flask was charged with ether (250 ml) and lithium aluminium hydride (3 g, 0.079 mole) added. The mixture was stirred and heated to a gentle reflux in order to dissolve the amide contained in the thimble. When the first extract returned to the flask vigorous refluxing occurred but, as the amide was extracted, the reaction became less vigorous. About three or four cycles were sufficient to extract all the amide. A white solid precipitated from the reaction mixture and refluxing was continued for 3 hours. At the end of this period the reaction mixture was cooled and the excess hydride and aluminium complexes were decomposed by the cautious addition of water (25 ml). More solid was deposited during this process. The reaction mixture was filtered and the solid washed with ether (2×50 ml).

The combined filtrates were then evaporated to leave a yellow oil which crystallised slowly to a slightly waxy solid. (Yield 17.0 g, 88.3%). The structure and purity of the product as N-methyl-N-octadecylaniline was confirmed by mass spectrometry and chromatography.

Further compounds in accordance with Formula I and their properties are set out below. Each compound was made by the process described in Example 1 using an equivalent quantity of the indicated coupler in place of the coupler used in Example 1.

EXAMPLE 3

Coupler: N-ethyl-N-n-hexylaniline.

Product: 4-(4-[N-n-hexyl-N-ethylamino]phenylazo)-3-nitrobenzoic acid.

Properties: MP: 167° C.; Abs Max: 491 nm (CCl$_3$).

EXAMPLE 4

Coupler: N,N-di-n-heptylaniline.

Product: 4-(4-[N,N-di-n-heptylamino]phenylazo)-3-nitrobenzoic acid.

Properties: MP: 140° C.; Abs Max: 494 nm (CCl$_3$).

EXAMPLE 5

Coupler: 2-octadecoxyaniline.

Product: 4-(4-amino-3-octadecoxyphenylazo)-3-nitrobenzoic acid.

Properties: MP: °C.; Abs Max: nm (CCl$_3$).

EXAMPLE 6

Coupler: N-n-dodecyl-1,2,3,4-tetrahydroquinoline.

Product: 4-(4-[N-dodecyltetrahydroquinolin-6-ylazo)-3-nitro-benzoic acid.

Properties: MP: 142° C.; Abs Max: 508 nm (CCl$_3$).

Compounds in accordance with Formula I which can be made by the process of Example 1 using equivalent quantities of the appropriate diazo component and coupler are listed in Tables 5 to 7 below.

TABLE 5

Compounds of Formula I in which:
X is —C=C—; and R = R$^4$ = R$^5$ = R$^6$ = R$^7$ = H

| Cpd No | R$^1$ | R$^2$ | R$^3$ |
|---|---|---|---|
| 1 | NO$_2$ | C$_2$H$_5$ | C$_6$H$_{13}$ |
| 2 | NO$_2$ | C$_7$H$_{15}$ | C$_7$H$_{15}$ |
| 3 | NO$_2$ | C$_8$H$_{17}$ | C$_8$H$_{17}$ |
| 4 | NO$_2$ | C$_2$H$_5$ | C$_{16}$H$_{33}$ |
| 5 | NO$_2$ | CH$_3$ | C$_{18}$H$_{37}$ |
| 6 | NO$_2$ | CH$_3$ | C$_{12}$H$_{25}$ |
| 7 | CN | CH$_3$ | C$_{12}$H$_{25}$ |
| 8 | COOCH$_3$ | CH$_3$ | C$_{12}$H$_{25}$ |

TABLE 6

Compounds of Formula I in which:
X is —C=C—; and R = R$^4$ = R$^6$ = H

| Cpd No | R$^1$ | R$^2$ | R$^3$ | R$^5$ | R$^7$ |
|---|---|---|---|---|---|
| 9 | NO$_2$ | C$_2$H$_5$ | C$_{18}$H$_{37}$ | OCH$_3$ | H |
| 10 | NO$_2$ | CH$_3$ | CH$_3$ | OC$_{18}$H$_{37}$ | H |
| 11 | NO$_2$ | H | H | OC$_{16}$H$_{33}$ | H |
| 12 | CN | H | H | OC$_{16}$H$_{33}$ | H |
| 13 | COOCH$_3$ | H | H | OC$_{16}$H$_{33}$ | H |
| 14 | NO$_2$ | C$_{12}$H$_{25}$ | *—(CH$_2$)$_3$—* | | H |
| 15 | CN | C$_{12}$H$_{25}$ | *—(CH$_2$)$_3$—* | | H |
| 16 | COOCH$_3$ | C$_{12}$H$_{25}$ | *—(CH$_2$)$_3$—* | | H |
| 17 | NO$_2$ | C$_4$H$_9$ | C$_6$H$_{13}$ | —CH=CH—CH=CH— | |
| 18 | CN | C$_4$H$_9$ | C$_6$H$_{13}$ | —CH=CH—CH=CH— | |
| 19 | COOCH$_3$ | C$_4$H$_9$ | C$_6$H$_{13}$ | —CH=CH—CH=CH— | |

Notes
*—(CH$_2$)$_3$—* indicates that R$^3$ and R$^5$ together with the N atom and two C atoms of Ring A form a tetrahydropyridine ring fused to Ring A, i.e. Ring A, R$^3$, R$^5$ and the N atom form a 1,2,3,4-tetrahydroquinoline nucleus.

—CH=CH—CH=CH— indicates that R$^5$ and R$^7$ together with two C atoms of Ring A form a benzene ring fused to Ring A, i.e. Ring A, R$^5$ and R$^7$ form a naphthalene nucleus

TABLE 7

| | | Compounds of Formula I in which R = R⁶ = H | | | | |
|---|---|---|---|---|---|---|
| Cpd | X | $R^1$ | $R^2$ | $R^3$ | $R^4$ | $R^7$ |
| 20 | S | $NO_2$ | $CH_3$ | $C_{16}H_{33}$ | H | — |
| 21 | S | CN | $CH_3$ | $C_{16}H_{33}$ | H | — |
| 22 | S | $COOCH_3$ | $CH_3$ | $C_{16}H_{33}$ | H | — |
| 23 | S | $NO_2$ | H | H | $COOC_{18}H_{37}$ | — |
| 24 | O | $NO_2$ | $C_2H_5$ | $C_{18}H_{37}$ | H | — |
| 25 | O | CN | $C_2H_5$ | $C_{18}H_{37}$ | H | — |
| 26 | O | $COOCH_3$ | $C_2H_5$ | $C_{18}H_{37}$ | H | — |
| 27 | —C=N—$R^7$ | $NO_2$ | $CH_3$ | $C_{18}H_{37}$ | H | $NHCH_3$ |
| 28 | —C=N—$R^7$ | CN | $CH_3$ | $C_{18}H_{37}$ | H | $NHCH_3$ |
| 29 | —C=N—$R^7$ | $COOCH_3$ | $CH_3$ | $C_{18}H_{37}$ | H | $NHCH_3$ |
| 30 | —C=N—$R^7$ | $NO_2$ | H | $C_{12}H_{25}$ | CN | $NHC_2H_5$ |

EXAMPLE 7

A dipping bath was prepared by slowly dripping 10 μl of a solution of DPNA (as prepared in Example 1) in chloroform (1 mg/ml) from a micro-syringe onto the surface of an aqueous sub-phase (water purified using a Milli-Q system) having a surface area of 1000 cm² in a Joyce-Loebl Langmuir Trough. The solvent was permitted to evaporate for at least 5 minutes before the surface pressure was adjusted to 15 mN/m by movement of the barriers at which level it was maintained throughout the dipping process.

A thin glass plate, pre-cleaned by ultrasonic washing in chloroform and methanol, was successively dipped into and withdrawn from the sub-phase at a speed of 3 mm/min. Deposition of a monolayer of DPNA occurred substantially only during withdrawal of the substrate from the sub-phase and dipping was continued until a film comprising 20 monolayers of DPNA had been deposited on the part of both of the parallel faces of the plate which passed through the monolayer of DPNA. Substantially all the molecules of DPNA in the film were aligned in parallel array with their vectors in the same sense, i.e. the molecules in the separate monolayers were in "head to tail" array (Z-type deposition). The film of DPNA was removed from one plane surface of the plate and the resulting optical element (OA1) comprised a glass substrate coated on one plane surface with 20 monolayers of DPNA.

EXAMPLE 8

The dipping bath described in Example 7 was prepared except that the purified water of the aqueous phase was replaced by a solution of $10^{-3}$ moles/liter of $CdCl_2$ in the same purified water. The dipping procedure described in Example 7 was then repeated except that the surface pressure was reduced to 4 mN.m⁻¹ while the glass plate was passing into the aqueous phase and increased to 24 mN.m⁻¹ while the glass plate was being removed from the aqueous phase in order to ensure Z-type deposition of DPNA on the surfaces of the plate. Dipping was continued until a film comprising 20 monolayers of the cadmium salt of DPNA had been deposited on the plate and thereafter the procedure of Example 7 was followed to produce an optical element coated on one plane face with 20 monolayers of the cadmium salt of DPNA (OA2).

EXAMPLE 9

The procedure of Example 8 was repeated except that dipping was terminated after a single monolayer of the cadmium salt of DPNA had been deposited to produce an optical element comprising a glass substrate coated on one plane surface with a single monolayer of the cadmium salt of DPNA (OA3).

This procedure was then repeated except that the DPNA was replaced by an equimolar quantity of OPNA as prepared in Example 2 to produce an optical element comprising a glass substrate coated on one plane surface with a single monolayer of the cadmium salt of OPNA (OA4).

EXAMPLE 10

The optical element described in Example 7 (OA1) was used in the following manner to demonstrate the non-centro-symmetric nature of the applied film.

A beam of radiation from a Nd:YAG pulsed laser (wavelength: 1,064 nm; pulse duration 20 ns; repetition rate 10 Hz) was passed transversely through the plate and the film of DPNA. The intensity of radiation at the second harmonic (wavelength: 530 nm) generated during passage through the element, after filtering out the transmitted radiation at the fundamental wavelength (1,064 nm), was detected and measured with a photomultiplier. By calibration with a 2 mm thick quartz reference plate, the second order non-linear optical coefficient $\chi^{(2)}$ was calculated as $2.1 \times 10^{-20} C^3J^{-2}$. The molecular second order electronic polarisability SOEP[1.06] can be calculated from this value to be (in SI units) $4.5 \times 10^{48} C^3J^{-2}M^3$ ($=1200 \times 10^{-30}$ cm⁵/esu).

EXAMPLE 11

The procedure of Example 10 was repeated using the optical element described in Example 8 (OA2) in place of the optical element described in Example 7. The calculated value of the second order, non-linear, optical coefficient, $\chi^{(2)}$, derived from the measured value of the intensity of the second harmonic radiation, was $2.5 \times 10^{-20} C^3J^{-2}$. The molecular second order electronic polarisability SOEP[1.06] can be calculated from this value to be (in SI units) $3.3 \times 10^{-48} C^3J^{-2}M^3$ ($=890 \times 10^{-30}$ cm⁵/esu).

EXAMPLE 12

The procedure of Example 10 was repeated using in turn each of the optical elements described in Example 9 (OA3 and OA4) in place of the optical element described in Example 7 (OA1). The intensity of the radiation of the second order harmonic signal generated by the passage of the laser beam through the optical element OA4 was 53% of the intensity of the second order harmonic signal generated by passage of the laser beams through optical element OA3.

We claim:

1. An optical element having non-linear optical properties comprising a transparent or reflecting substrate having a coating which consists essentially of at least two monomolecular layers of a compound of the formula set forth below wherein the molecules in both molecular layers are aligned in the same manner:

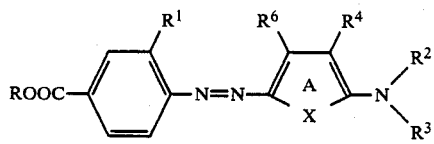

wherein

R is selected from H, cadmium, calcium, barium, lead, manganese, zinc, magnesium and strontium or a group containing a tetravalent nitrogen atom selected from ammonium, bis(ammonium), guanidinium, biguanidinium, amidinium and a mono-, di- or tri-substituted or quaternary ammonium group in which the substituents are selected from $C_{1-20}$-alkyl, $C_{1-4}$-alkoxy-$C_{1-20}$-alkyl, halo-$C_{1-20}$-alkyl, hydroxy-$C_{1-20}$-alkyl, phenyl, $C_{1-4}$-alkyphenyl, $C_{1-4}$-alkoxyphenyl, halophenyl, hydroxyphenyl, benzyl, $C_{1-4}$-alkylbenzyl, $C_{1-4}$-alkoxybenzyl, halobenzyl, hydroxybenzyl, cyclohexyl and $C_{1-4}$-alkyl-cyclohexyl;

X is

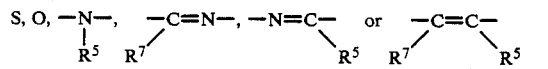

$R^1$ is $NO_2$, CN or COOY;

Y is selected from $H_1$, $C_{1-4}$-alkyl, cadmium, calcium, barium, lead, manganese, zinc, magnesium and strontium or a group containing a tetravalent nitrogen atom selected from ammonium, bis(ammonium), guanidinium, biguanidinium, amidinium and a mono-, di- or tri-substituted or quaternary ammonium group in which the substituents are selected from $C_{1-20}$-alkyl, $C_{1-4}$-alkoxy-$C_{1-20}$-alkyl, halo-$C_{1-20}$-alkyl, hydroxy-$C_{1-20}$-alkyl, phenyl, $C_{1-4}$-alkyphenyl, $C_{1-4}$-alkoxyphenyl, halophenyl, hydroxyphenyl, benzyl, $C_{1-4}$-alkylbenzyl, $C_{1-4}$-alkoxybenzyl, halobenzyl, hydroxybenzyl, cyclohexyl and $C_{1-4}$-alkyl-cyclohexyl;

$R^2$ and $R^3$ are each independently H or non-hydrophilic aliphatic or cycloaliphatic group containing up to 30 carbon atoms selected from alkyl, alkenyl, cycloalkyl, a mixture thereof and alkyl, alkenyl, cycloalkyl or a mixture thereof interrupted by not more than one oxygen or sulphur for every twelve chain carbon atoms;

$R^4$ and $R^5$ are each independently H or non-hydrophilic aliphatic or cycloaliphatic group containing up to 30 carbon atoms selected from alkyl, alkenyl, cycloalkyl, a mixture thereof and alkyl, alkenyl, cycloalkyl or a mixture thereof interrupted by not more than one oxygen or sulphur for every twelve chain carbon atoms, each of $R^4$ and $R^5$ being attached directly to Ring A or joined thereto by a linking group selected from oxygen, sulphur, nitrogen, —CO—, —SO$_2$, —CO.O— and SO$_2$.O; and $R^6$ and $R^7$ are each independently H or non-hydrophilic aliphatic group containing up to 4 carbon atoms selected from $C_{1-4}$-alkyl, $C_{1-4}$-alkoxy, $NH_2$, and mono- and di-$C_{1-4}$-alkylamino; or $R^4$ and $R^6$ together with the carbon atoms of Ring A to which they are attached form a benzene, pyrrole, furan, thiazole, isothiazole, thiophene or pyridine ring fused to Ring A and $R^5$ and $R^7$ are as hereinbefore defined; or $R^5$ and $R^7$ together with the carbon atoms of Ring A to which they are attached form a benzene, pyrrole, furan, thiazole, isothiazole, thiophene or pyridine ring fused to Ring A and $R^4$ and $R^6$ are as hereinbefore defined; or $R^2$ and $R^4$ together with the N atom and the carbon atoms of Ring A to which they are attached form a 2-pyrroline, tetrahydropyridine, 4-oxazoline or 4-thiazoline ring fused to Ring A and $R^3$ and $R^5$ are as hereinbefore defined; or $R^3$ and $R^5$ together with the N atom and the carbon atoms of Ring A to which they are attached form a 2-pyrroline, tetrahydropyridine, 4-oxazoline or 4-thiazoline ring fused to Ring A and $R^4$ and $R^6$ are as hereinbefore defined; or provided there are, in total, from 8 to 40 carbon atoms in one or two of the groups independently represented by $R^2$, $R^3$, $R^4$ and $R^5$.

2. An optical device comprising a non-linear optical element according to claim 1.

* * * * *